Sept. 24, 1957   J. TURNER   2,807,111
ORNAMENTED MIRRORS AND METHOD OF MAKING SAME
Filed Sept. 18, 1953   2 Sheets-Sheet 1

INVENTOR.
Jonathan Turner
BY
Gary, Desmond & Parker
Attys.

Sept. 24, 1957     J. TURNER     2,807,111
ORNAMENTED MIRRORS AND METHOD OF MAKING SAME
Filed Sept. 18, 1953     2 Sheets-Sheet 2
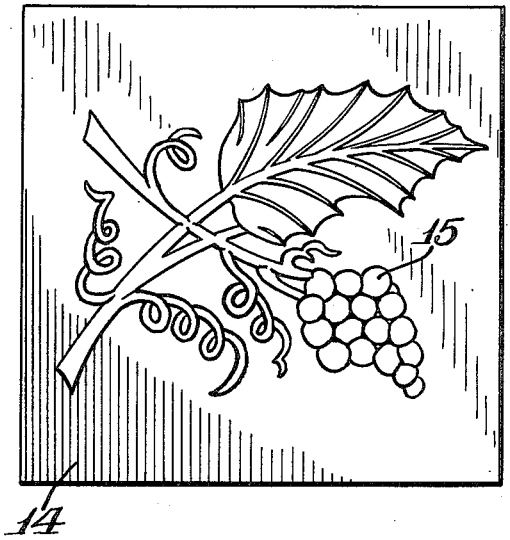
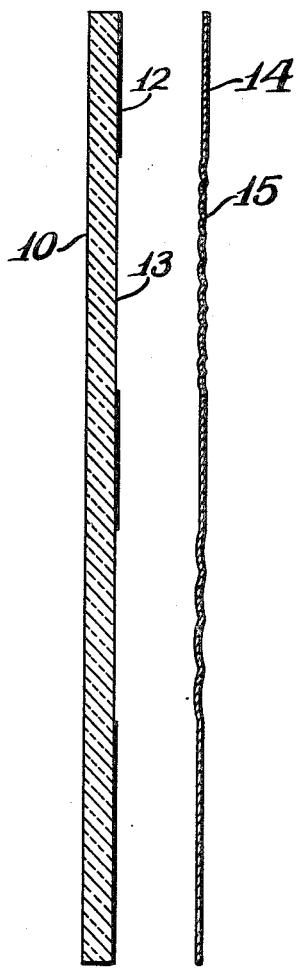
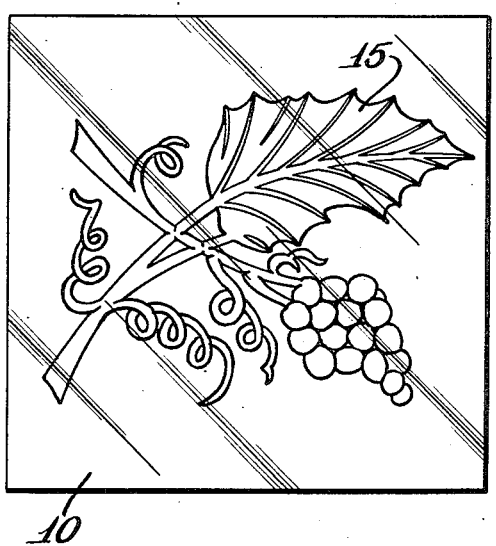
INVENTOR.
Jonathan Turner
BY
Gary Desmond & Parker
Attys.

United States Patent Office 2,807,111
Patented Sept. 24, 1957

2,807,111

ORNAMENTED MIRRORS AND METHOD OF MAKING SAME

Jonathan Turner, Chicago, Ill., assignor to Turner Manufacturing Company, Chicago, Ill., a corporation of Illinois Application September 18, 1953, Serial No. 381,022

2 Claims. (Cl. 41—22)

This invention relates to the production of ornamented or decorated mirrors, and particularly to the production of mirrors having ornamented or decorated portions or areas of simulated engraved, etched or cut character.

It is an object of the present invention to produce ornamented mirrors of the foregoing class in a novel manner or sequence of steps and by a novel arrangement of parts or components, to result not only in an enhanced decorative effect, but also in great economies over the prior process of engraving or grinding and polishing to produce highly reflective designs in relief in the mirror.

The character of the product of the present invention and the method of producing the same will be further understood and explained in connection with the following specification and drawings, wherein:

Fig. 5 is a plan view of an embossed backing sheet for assembly with the mirrored piece illustrated in Fig. 4.

Fig. 6 is an enlarged sectional view of the components shown in Figs. 4 and 5 spaced apart to illustrate their relationship to each other prior to being brought together.

Fig. 7 is a plan view of the face of the assembled decorated mirror.

Figure 1:
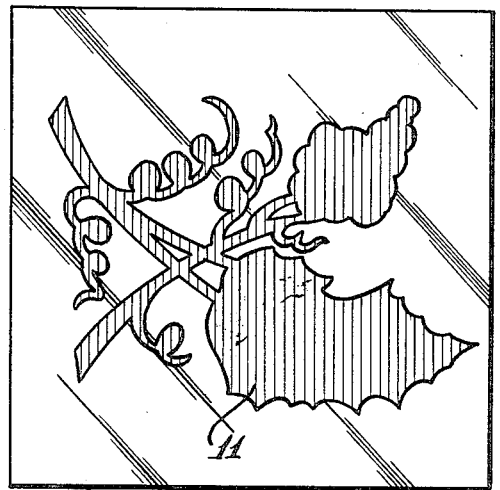
Fig. 1 is a plan view illustrating a piece of clear glass of which the mirror of my invention is to be formed, having a planar temporary design mask thereon.

Referring to the drawings, the reference numeral 10 indicates a plate of glass of which the mirror is to be formed for the purpose of illustration, it being understood that the mirror may be of any size or shape, and that the ornamentation may be of any portion thereof, such as the border, or that mirrored panels may be formed in accordance with the present invention for assembly with non-ornamented mirrors or panels, and the like. The ornamental designs shown in the drawings are likewise for the purpose of illustration only.

As a first step in the process of forming the mirror of the present invention, I apply to one surface of the clear glass, which is to be the back of the mirror, a solid adherent mask 11 having the outline of the desired ornamentation, and which is impervious to the conventional mirror silvering solution to be subsequently applied thereover, and which adheres firmly to the glass so that none of the silvering solution will seep under the edges to mar the desired sharp fidelity of design outline. This design mask is applied by conventional silk screen means, and for this purpose I employ a solvent solution of a strippable film-forming plastic which after application flows to close any openings left by the meshes of the silk screen and air-dries to a solid impervious film adherent to the applied glass, but which can subsequently be lifted therefrom as a unit with ease. For the purpose of illustration, a suitable material may be a "strip lacquer" such as one composed of vinyl chloride-acetate copolymers plasticized with phthalate type plasticizer and dissolved in suitable organic solvents, and having a viscosity of from about 75 to about 78 Ku at 150 g.

Figure 2:
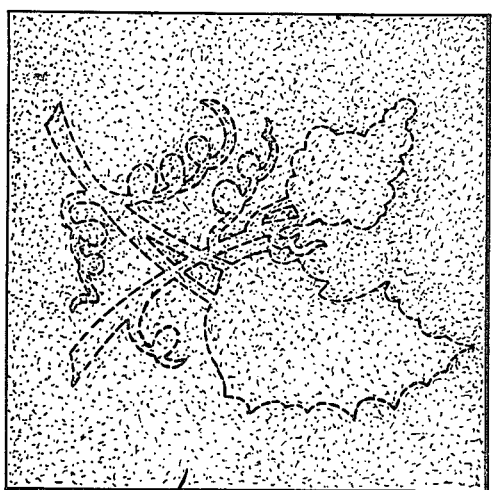
Fig. 2 is a view similar to that of Fig. 1, illustrating a succeeding mirroring step.
Figure 3:
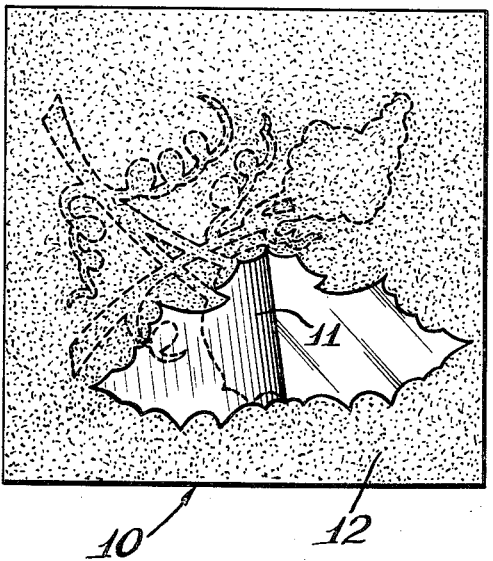
Figs. 3 and 4 illustrate further successive steps in the process, wherein the temporary design mask is respectively partially and completely removed.
Figure 4:
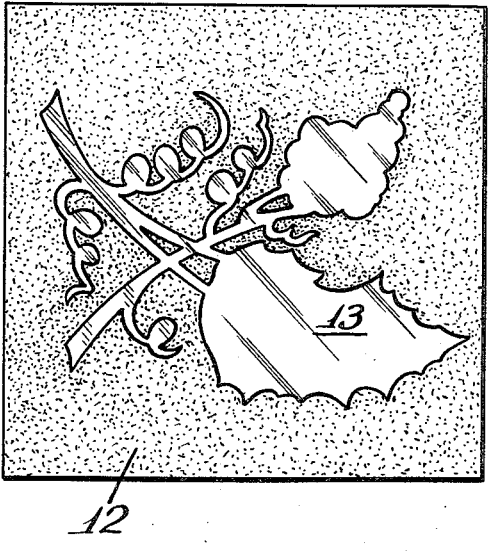

After this liquid plastic design is silk-screened onto the glass and air or otherwise dried, the side of the glass to which it was applied is then subjected to silvering by a conventional mirror silvering process, for example with a conventional aqueous silver-nitrate-reducing agent mirror silvering solution to deposit a silver coating 12 as in Fig. 2. After the silver becomes firmly fixed to the glass and dried, the plastic mask 11 is stripped from the glass as shown in Fig. 3 to leave a clear design area 13 as shown in Fig. 4 surrounded by the silvered area 12.

A separate opaque sheet of silver-coated thermoplastic material 14, such as for example cellulose acetate, suitably surface silvered by the vacuum process, is then heat embossed with a design 15 complementary to the outline 13 left by stripping the plastic mask 11, to provide intermediate detail. The embossed silvered sheet 14 is then placed against the silvered back 12 of the mirror in matching relationship so that the embossed design 15 is visible through the clear area 13 of the mirror as shown in Fig. 7, to provide a novel simulated engraved effect, and the two suitably secured together and backed up or formed in any suitable manner.

I claim as my invention:

1. A decorative mirror comprising a glass panel having a silvered reflective coating on one planar face thereof and formed with clear unsilvered areas defining a design outline, and an opaque silvered reflective backing sheet of relatively thin thermoplastic material secured against said coated glass face having an embossed design therein disposed rearwardly of said face complementary to and visible through said clear unsilvered glass areas within the confines of said design outline thereof.

2. The method of forming decorative mirrors which comprises, applying to one face of a glass plate a solvent solution of an adherent, strippable plastic to mask an area thereof having the outline of a desired decorative design, drying said plastic material to a solid film, applying over the whole of said partially masked face an aqueous mirror silvering solution, drying said solution, stripping said plastic therefrom to leave a clear unsilvered area defined by said design outline, embossing a reflective silvered sheet of thermoplastic material with a design complementary to the outlines of said unsilvered glass area and securing it against said silvered glass surface.

References Cited in the file of this patent

UNITED STATES PATENTS

| | | |
|---|---|---|
| 125,726 | Davis | Apr. 16, 1872 |
| 494,255 | De Jong | Mar. 28, 1893 |
| 718,281 | Rountree | Jan. 13, 1903 |
| 861,822 | Feher | July 30, 1907 |
| 1,342,767 | Schlesinger | June 8, 1920 |
| 2,065,406 | Silverman | Dec. 22, 1936 |
| 2,141,488 | Riedel | Dec. 27, 1938 |
| 2,157,649 | Birdseye et al. | Mar. 21, 1939 |
| 2,181,926 | Tiger | Dec. 5, 1939 |
| 2,456,376 | Chirelstein | Dec. 14, 1948 |
| 2,657,150 | Hermanson | Oct. 27, 1953 |